United States Patent [19]

Skinner et al.

[11] Patent Number: 5,010,525
[45] Date of Patent: Apr. 23, 1991

[54] SONAR TEST SYSTEM AND METHOD

[75] Inventors: Dale D. Skinner; John H. Thompson, both of Severna Park, Md.

[73] Assignee: Westinghouse Electric Corp., Pittsburgh, Pa.

[21] Appl. No.: 459,861

[22] Filed: Jan. 2, 1990

[51] Int. Cl.$^5$ .................................. H04B 17/00
[52] U.S. Cl. .................................................. 367/13
[58] Field of Search .................. 367/13; 434/6–10; 73/1 DV

[56] References Cited

U.S. PATENT DOCUMENTS

| | | | |
|---|---|---|---|
| 3,864,664 | 2/1975 | Trott et al. | 367/13 |
| 3,944,966 | 3/1976 | Rubega | 367/13 |
| 4,090,169 | 5/1978 | Adair et al. | 367/13 |
| 4,205,394 | 5/1980 | Pickens | 367/13 |
| 4,223,397 | 9/1980 | Bakewell, Jr. et al. | 367/13 |
| 4,290,123 | 9/1981 | Pickens | 367/13 |
| 4,430,883 | 2/1984 | Auphan | 73/1 DV |
| 4,468,760 | 8/1984 | Zalesak et al. | 367/13 |
| 4,563,756 | 1/1986 | Assard | 367/13 |
| 4,576,034 | 3/1986 | Ferree et al. | 367/13 |
| 4,648,079 | 3/1987 | Stedtnitz | 367/13 |

FOREIGN PATENT DOCUMENTS 1429770  3/1976  United Kingdom .

Primary Examiner—Thomas H. Tarcza
Assistant Examiner—Daniel T. Pihulic
Attorney, Agent, or Firm—D. Schron

[57] ABSTRACT

A single test transducer or a line array of test transducers is placed above the transducers of an array under test and provided with a simulated flow noise signal. The response of all of the transducers under test is derived and stored whereupon the test transducer or line array of test transducers is moved to a subsequent position wherein the process is repeated. After all positions are indexed, the stored signals representing the outputs of all of the transducers of the array under test for all transmissions are combined and processed to derive a transducer array output signal for analysis purposes.

9 Claims, 4 Drawing Sheets

SONAR TEST SYSTEM AND METHOD

This invention was made with Government support under Contract N00014-84-C-0491 awarded by the Department of the Navy. The Government has certain rights in this invention.

BACKGROUND OF THE INVENTION

1. Field of the Invention

The invention in general relates to the testing of sonar systems, and particularly to an arrangement of the type which eliminates need for movement of the sonar system through the water environment.

2. Background Information

Vehicle-carried sonar systems which travel through the water environment are limited in performance by virtue of unwanted noise which is generated during the course of travel. A predominant source of noise is flow noise caused by turbulence in the boundary layer surrounding the moving sonar array and as speed of movement through water increases, the flow noise may become the dominant noise in a well designed sonar receiver, particularly when operation is at the lower frequencies.

The detrimental effects of flow noise can be significantly reduced by a number of techniques such as streamlining of the carrying vehicle, proper placement of the transducers of the sonar array on the vehicle and geometric or amplitude-shading of the transducers, to name a few. If the response of the sonar system to the flow noise can be determined, corrective measures may be taken. The performance of the sonar system can be significantly increased by reducing the effects of flow induced noise.

Measuring flow noise and flow noise performance of a sonar system in the field is a technically difficult and very expensive undertaking. For example, propelling the sonar array through the water on a carrying vehicle creates not only flow noise but additionally, propulsion noise which is difficult, if not impossible, to separate from the flow noise. To eliminate propulsion noise complications, the array may be given what is known as a pop-up test wherein the sonar array is mounted on a buoyant vehicle that is pulled to the bottom of a body of water and released to rise to the surface using its own buoyancy as the propulsive force. Although this eliminates the propulsion noise such tests are very expensive and require a variety of specially designed and instrumented pop-up vehicles.

In order to eliminate the requirement for in situ testing, an alternative approach in common use is that of static test equipment. With such arrangement, a calibration array of test transducers is assembled, with the transducers of the calibration array being placed over the transducers of the sonar array under test, with an acoustic coupling medium between them. The movement of turbulence over the array under test is simulated by providing the test transducers with test signals indicative of a dynamic representation of moving vortices, such test signals being known a priori. Although this test arrangement provides some advantages, the calibration array to match the sonar array under test is very expensive and in many instances may equal or exceed the expense of the array under test. Further, a calibration array made for one system will not generally be applicable to other arrays of different size and shape.

It is an object of the present invention to provide a sonar test system which is more or less universal in its ability to test different sonar arrays, and at reduced expenses.

SUMMARY OF THE INVENTION

Apparatus for testing a transducer array includes a test transducer with a drive mechanism for initially positioning the test transducer over the array under test. Signal generating means provides the test transducer with a flow noise signal which is transmitted toward the array under test by way of an acoustic coupling medium. Means are provided for storing the resultant output signals of all of the transducers of the array in response to receipt of the flow noise indicative acoustic signal. Thereafter the drive mechanism is operable to move the test transducer to different predetermined positions over the array for projection of the acoustic signal in repetitive operations. Means are provided for combining and processing all of the output signals of the transducers of the array under test, for all transmissions of the testing transducer, to derive an array output response signal for analysis purposes.

In another embodiment, a plurality of test transducers is provided and arranged in a line array, either linear or curvilinear.

DESCRIPTION OF THE PREFERRED EMBODIMENTS

Figure 1:
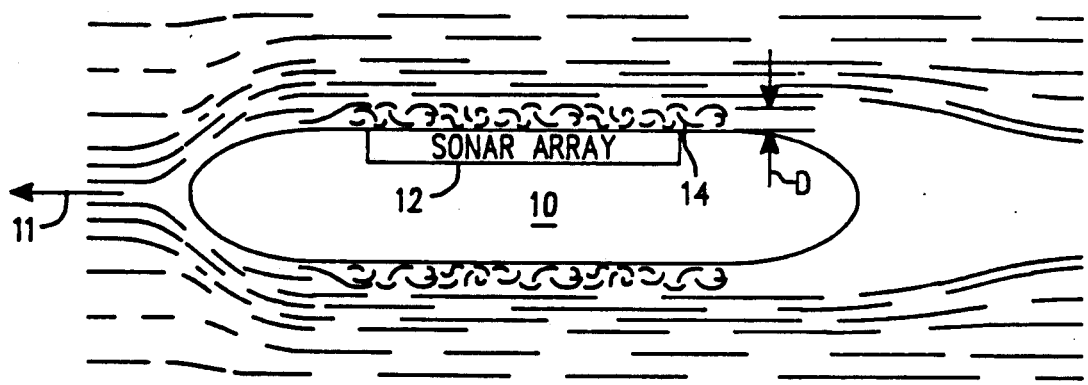
FIG. 1 basically illustrates a sonar array traveling through the water medium and carried by an underwater vehicle.

Referring now to FIG. 1, there is illustrated, by way of example, an underwater vehicle 10 traveling through the water medium in the direction of arrow 11. The vehicle carries a sonar array 12 which may be of the active or passive variety and operative to receive acoustic signals from a distant target in which signals may be either target-generated, in the case of a passive system, or return signals in the case of an active system.

As the vehicle 10 travels through the water, a boundary layer 14 surrounds the sonar array to a thickness D. Depending upon the vehicle's design, depth and speed, this boundary layer 14 may be populated with vortices and other flow irregularities that persist for some period of time making the boundary layer 14 a turbulent boundary layer such that the turbulence traveling over the face of the sonar array acts as a local pressure generator that introduces a noise signal into the sonar array, completely unrelated to the target.

The unwanted noise can be reduced by any one or more of a number of well-known design techniques such as modifying the shape of the vehicle, modifying the placement of the sonar array on the vehicle, isolation of the sonar array from the boundary layer, geometric shading or amplitude shading to reduce flow noise by wave vector filtering, to name a few. In order to avoid the numerous drawbacks associated with in situ testing of the sonar array, a static testing arrangement such as illustrated in FIG. 2 is commonly utilized.

Figure 2:
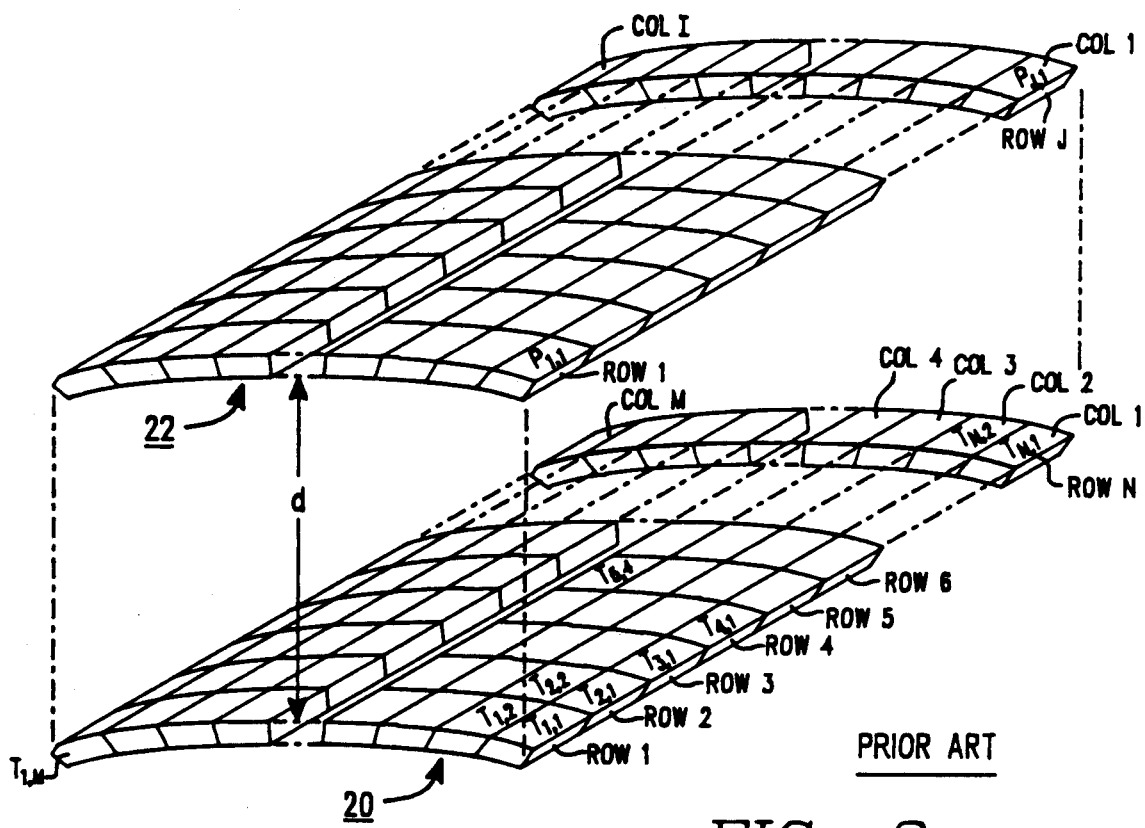
FIG. 2 is a view of a transducer array under test coupled with a transducer calibration or testing array, as utilized in the prior art.

In FIG. 2 numeral 20 represents an array of transducers which will be utilized as the sensors for a sonar system to be used in an underwater vehicle such as illustrated in FIG. 1. The transducer array under test is illustrated as being comprised of N rows and M columns, although the array need not be rectangular as illustrated.

A projector or testing array 22 having J rows and I columns for calibration purposes is disposed at a small distance d above the array 20 under test. The distance d, shown exaggerated in FIG. 2 for clarity, is generally chosen so as to place the projector array 22 at or very near the location of the turbulent boundary layer. With the arrays placed in a water medium, known electrical signals indicative of the simulation of movement of the turbulence over the array are provided to the transducers of the projector array 22 resulting in a dynamic representation of moving vortices to the array 20 under test.

In response to the projection of acoustic signals representing the traveling vortices, the transducers of array 20 under test provide respective output signals which are processed, providing an indication of response of the array to the turbulence so that one or more of the corrective measures previously discussed may be applied to significantly reduce or eliminate target unrelated noise signals.

Although the arrangement of FIG. 2 provides the advantage of controlled laboratory testing, the projector or calibration array 22 is as large and as expensive as the actual array 20 under test. Further, the calibration array 22 exactly matches the size and curvature of the array 20 under test and will not generally be applicable to other arrays of different size and shape. The present invention provides for a much less expensive arrangement and wherein transducer arrays of various sizes, shapes and curvatures to be tested can be accommodated, and to this end reference is made to FIG. 3.

Figure 3:
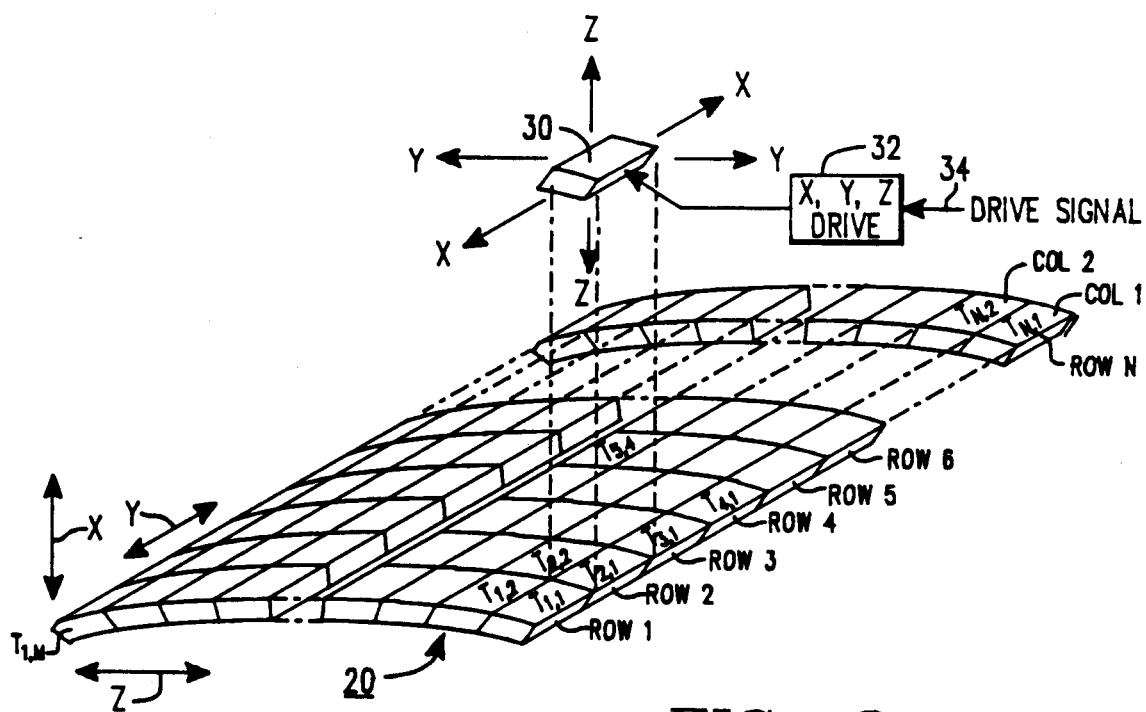
FIG. 3 illustrates one embodiment of the invention for testing a transducer array lying along a curvilinear surface.

FIG. 3 reproduces the array 20 under test in relation to a vertical Z axis, longitudinal X axis, and transverse Y axis. In one embodiment of the present invention, a single test transducer 30 is positioned at a small distance d above a predetermined transducer of the array 20 under test. A drive mechanism 32 is coupled to the transducer 30 to initially position it and to move it to other predetermined positions over the transducers to be tested by means of a drive signal applied at input 34. The drive mechanism 32 is of the type which can move the test transducer 30 in three mutually perpendicular directions (X, Y and Z) to accommodate the curvilinear nature of the array 20 under test.

Figure 4:
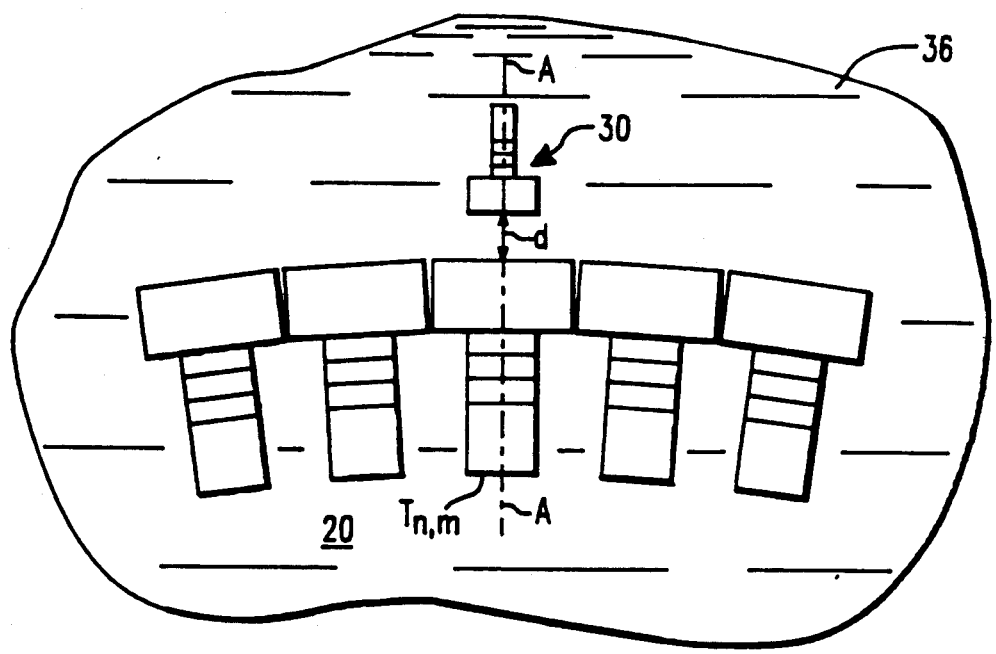
FIG. 4 further illustrates the orientation of the test transducer relative to the transducers under test.

FIG. 4 illustrates a typical test transducer 30 positioned, at a distance d over a transducer $T_{n,m}$ of the array 20 under test with an acoustic coupling medium 36 being provided for transmission of acoustic energy. The acoustic coupling medium may advantageously be provided by the water in a test tank. Each of the transducers 30 and $T_{n,m}$ include a central longitudinal axis A and in the embodiment illustrated in FIG. 4, the axis of the two transducers are colinear.

As will be explained, in operation, test transducer 30 is provided with a flow noise signal and in response thereto projects a corresponding acoustic signal across the coupling medium toward the array 20 under test where the response to the transmission of all of the transducers of the array under test are recorded. Thereafter, the drive mechanism 32 (FIG. 3) moves the test transducer 30 to a new position over another transducer of the array 20 where the process is repeated until the entire array is tested.

Figure 5:
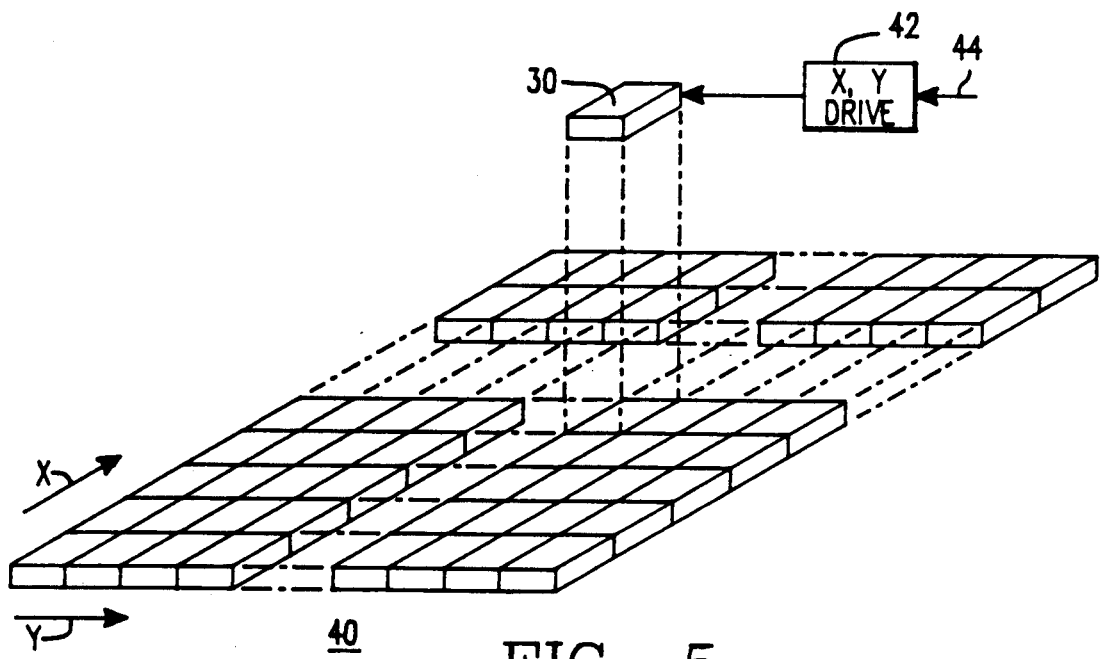
FIG. 5 is another embodiment of the present invention for testing the transducers of an array lying in a planar surface.

In FIG. 5 there is illustrated a transducer array 40 under test with the array being planar so as to extend in the direction of only the longitudinal X axis and transverse Y axis, as opposed to the curvilinear array of FIG. 3. The test transducer 30 is illustrated as being disposed above one of the transducers of array 40 and is positioned over other transducers of the array by means of drive mechanism 42 in response to a drive signal on input 44. In actual practice, to accommodate for both curvilinear as well as planar arrays the drive mechanism would be as illustrated in FIG. 3 and driven only in the X, Y direction for the planar array embodiment of FIG. 5.

Figure 6:
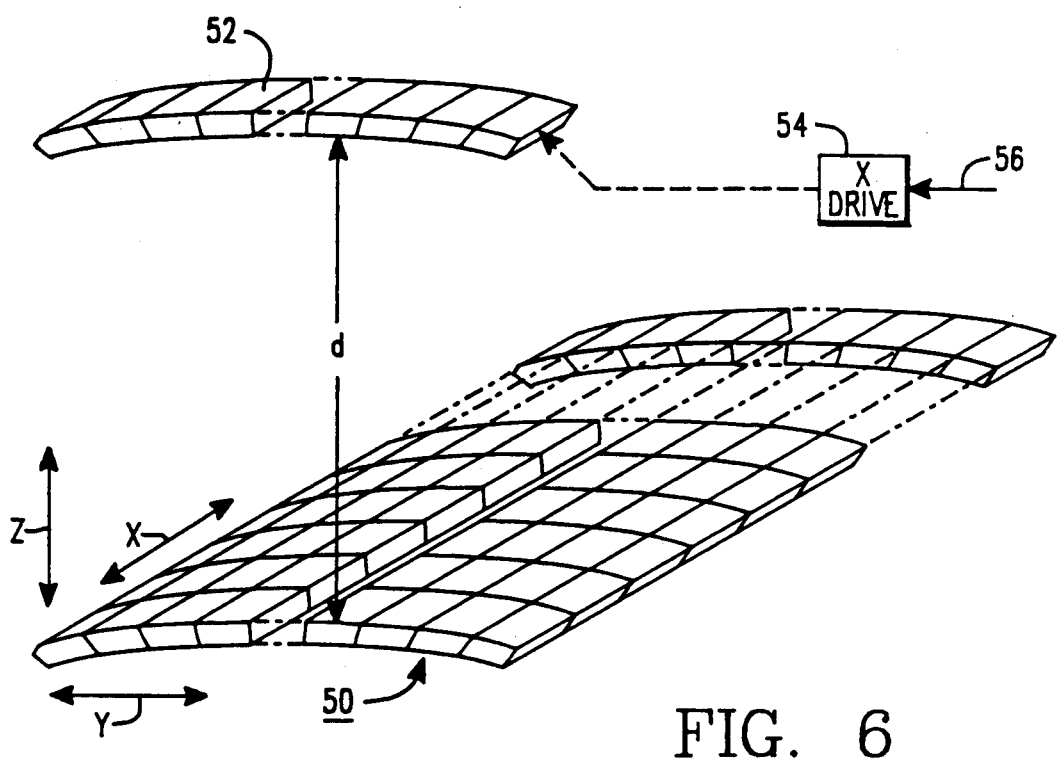
FIG. 6 illustrates another embodiment of the invention utilizing a line array of test transducers wherein the line array is curvilinear.

FIG. 6 illustrates another embodiment of the present invention for the testing of curvilinear arrays such as array 50. A line array 52 of test transducers has the test transducers thereof arranged in a curvilinear line to match a curvilinear row of the array 50 under test. With such arrangement, the drive mechanism 54 need only be supplied with an X drive signal on input 56. Flow noise signals are provided to the transducers of the line array 52 and the response of all of the transducers of the array under test 50 are recorded and thereafter the drive mechanism 54 is operable to move the line array 52 to a new row position where the process is repeated until all of the rows are accommodated.

Figure 7:
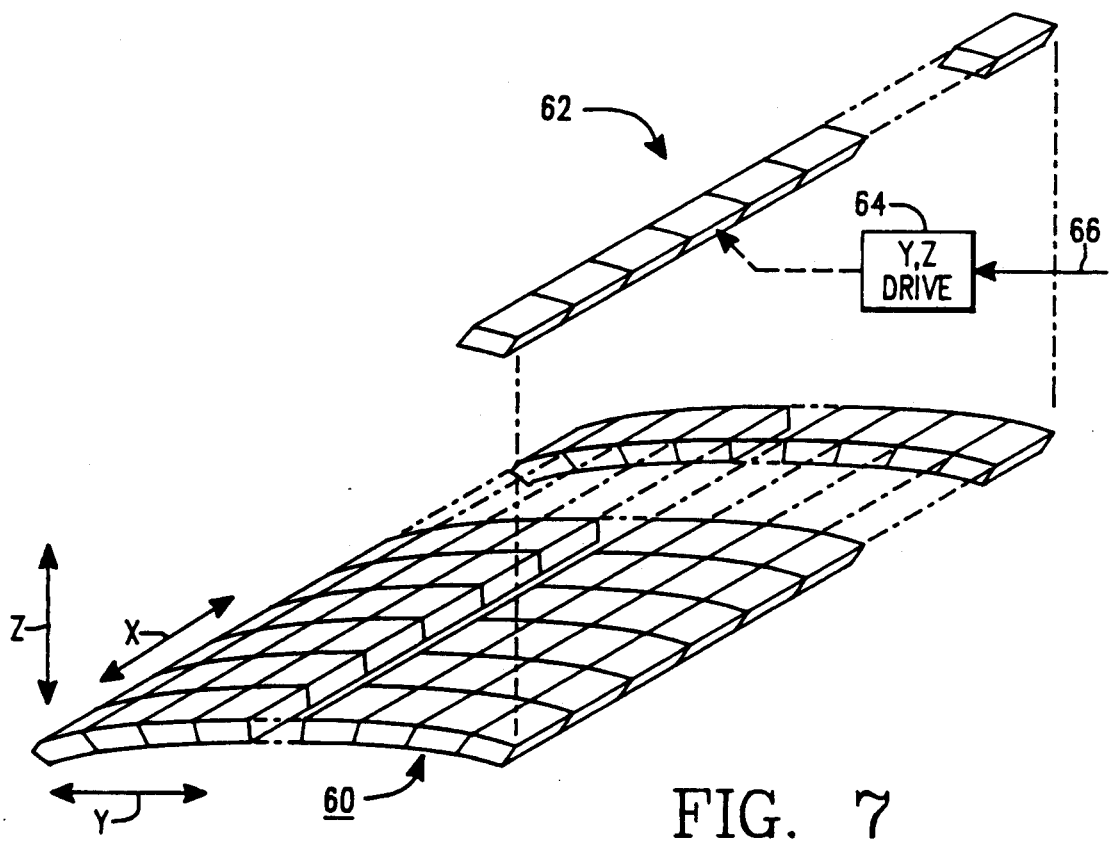
FIG. 7 illustrates an arrangement wherein the test transducers lie along a straight line.

In FIG. 7, illustrating another embodiment of the present invention, a line array 62 of test transducers is provided, with the transducers thereof being arranged along a straight line above a predetermined column of the transducer array 60 under test. With such arrangement, drive mechanism 64 is operable to receive an Y, Z drive signal on input 66 for positioning line array 62 over subsequent predetermined columns whereby the process of providing a noise signal to the transducers of the line array 62 and recording the response of all of the transducers under test may be accomplished. With the embodiment of FIG. 7, both curvilinear and planar arrays can be tested and in the case of planar arrays, only a Y drive signal need be provided to the drive mechanism.

Figure 8:
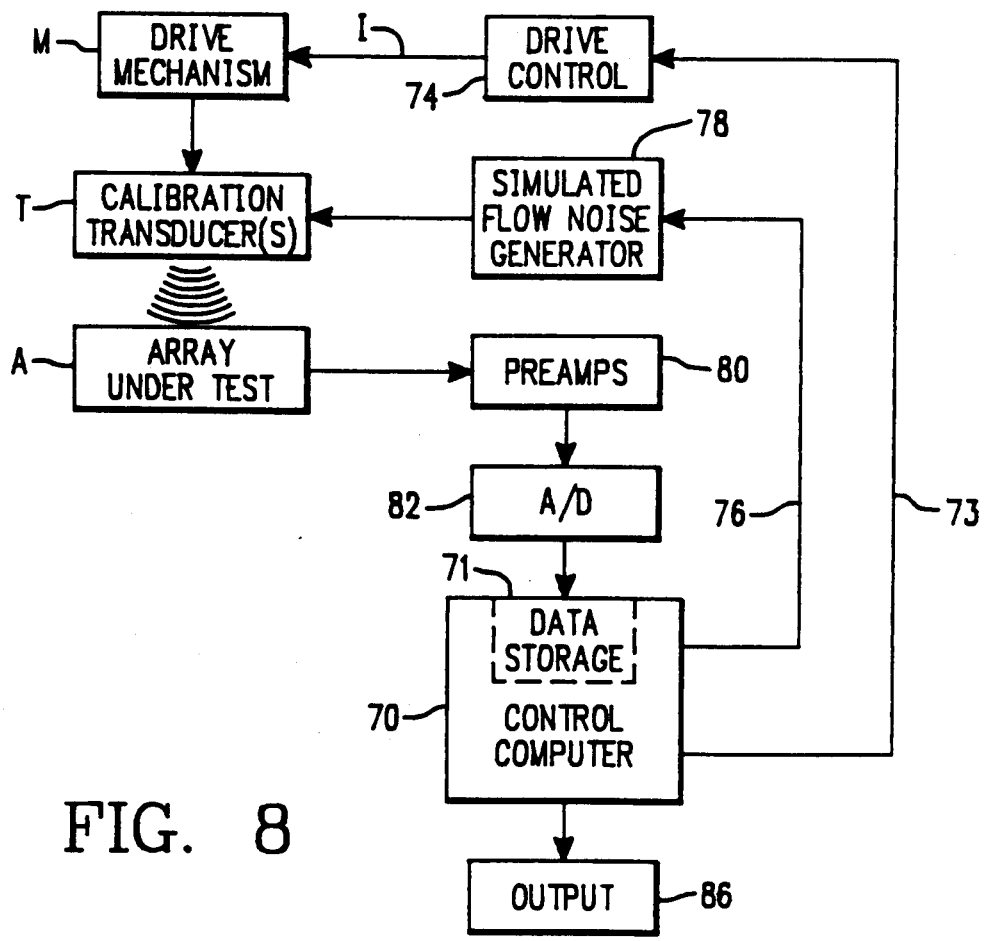
FIG. 8 is a block diagram of apparatus for performing flow noise tests in accordance with the present invention.

FIG. 8 is a block diagram illustrating the operation of the present invention. The array under test is generally represented by the letter A and corresponds to arrays 20, 40, 50 and 60. The calibration or test transducer or transducers is generally represented by the letter T and corresponds to either test transducer 30 or the line of test transducers 52 or 62. The drive mechanism generally indicated by the letter M corresponds to drive mechanisms 32, 42, 54 or 64 and the input I corresponds to inputs 34, 44, 56 or 66.

The entire operation is governed by a control computer 70 having adequate data storage 71. Control computer 70 initially positions the calibration transducer T at a certain position above the array under test A by means of a control signal on line 73, such control signal being provided to drive control means 74 operable in response to the control signal on line 73 to generate a drive signal which is provided to drive mechanism M on input line I. When the calibration transducer is positioned, control computer 70 provides a signal on line 76 to a simulated flow noise generator 78 which provides a known flow noise signal to the calibration transducer T.

In response to the flow noise signal, the calibration transducer T projects a corresponding acoustic signal across the coupling medium to the array under test A whereupon all of the transducers of such array provide corresponding output signals which are preamplified in amplifier arrangement 80 and thereafter converted to digital form in the analog to digital converter 82 for subsequent storage in data storage 71. Thereafter, a subsequent control signal on line 73 causes the repositioning of calibration transducer T whereupon the process is repeated until all locations have been indexed.

The control computer 70 is thereafter operable to access all of the stored data so as to process all of the output signals of the transducers of the array under test for all the transmissions of the test transducer T to derive an array output response signal for analysis purposes. To this end, an output means 86 is provided for visual display and for recording of the signal processing results. With the response of the array A under test thereby known, the array may be modified by well-known techniques to reduce or eliminate the effect of the unwanted noise.

Thus there has been described improved apparatus and method for testing sonar arrays for flow noise response wherein the cost for the test equipment is significantly reduced. Further, the computer control scanning arrangement and signal processing may be general enough to be usable for a wide variety of types of arrays and tests.

What is claimed is:

1. Apparatus for testing a transducer array, comprising:
   (A) a test transducer;
   (B) a drive mechanism for positioning said test transducer over said array;
   (C) an acoustic coupling medium disposed between said test transducer and said array;
   (D) signal generating means for providing said test transducer with a simulated flow noise signal;
   (E) said test transducer being operable to transmit a corresponding acoustic signal across said medium toward said array;
   (F) means for storing the resultant output signals of all of the transducers of said array in response to receipt of said acoustic signal;
   (G) means for providing said drive mechanism with a drive signal to move said test transducer to different predetermined positions over said array for projection of said acoustic signal; and
   (H) means for combining and processing all of said output signals of the transducers of said array, for all transmissions of said test transducer, to derive an array output response signal for analysis purposes.

2. Apparatus according to claim 1 wherein:
   (A) said transducer array is curvilinear; and
   (B) said drive mechanism is operable to move said test transducer in an XYZ coordinate system.

3. Apparatus according to claim 1 wherein:
   (A) said transducer array is planar; and
   (B) said drive mechanism is operable to move said test transducer in at least an XY coordinate system.

4. Apparatus according to claim 1 wherein:
   (A) said test transducer and each transducer of said array includes a central axis;
   (B) said drive mechanism is operable, for each said predetermined position, to place said test transducer directly over and coaxial with a transducer of said array.

5. Apparatus for testing a transducer array comprising:
   (A) a plurality of test transducers arranged in a line array;
   (B) a drive mechanism for positioning said line array over the transducer array under test;
   (C) an acoustic coupling medium disposed between said line array and said transducer array under test;
   (D) signal generating means for providing all of said test transducers with respective simulated flow noise signals;
   (E) said test transducers being operable to transmit corresponding acoustic signals across said medium toward said array;
   (F) means for storing the resultant output signals of all of the transducers of said transducer array under test in response to receipt of the acoustic signals provided by said test transducers;
   (G) means for providing said drive mechanism with a drive signal to move said line array to different predetermined positions over said array for projection of said acoustic signals; and
   (H) means for combining and processing all of said output signals of the transducers of said transducer array under test, for all transmissions of said test transducers, to derive a transducer array output response signal for analysis purposes.

6. Apparatus according to claim 5 wherein:
   (A) said drive mechanism is operable to move said line array in at least a one-dimensional coordinate system.

7. A method of testing a transducer array comprising the steps of:
   (A) positioning a test transducer at an initial predetermined position over said array with an acoustic coupling medium therebetween;
   (B) providing a simulated flow noise signal to said test transducer for transmission of a corresponding acoustic signal across said medium toward said array;
   (C) storing the resulting output signal of each transducer of said array in response to said transmitted acoustic signal;
   (D) moving said test transducer to a new position above said array;
   (E) repeating steps B to D until a final predetermined position is attained; and
   (F) combining and processing all of said stored signals to derive an array output signal for analysis purposes.

8. A method according to claim 7 which includes the step of:
   (A) maintaining the same distance between said test transducer and said array for each new position of said test transducer.

9. A method of testing a transducer array comprising the steps of:

(A) positioning a line array of test transducers at an initial predetermined position over said transducer array with an acoustic coupling medium therebetween;

(B) providing simulated flow noise signals to said test transducers for transmission of corresponding acoustic signals across said medium toward said transducer array;

(C) storing the resulting output signal of each transducer of said transducer array in response to said transmitted acoustic signals;

(D) moving said line array of test transducers to a new position above said transducer array;

(E) repeating steps B to D until a final predetermined position is attained; and (F) combining and processing all of said stored signals to derive a transducer array output signal for analysis purposes.

* * * * *